(12) United States Patent
Yokota (10) Patent No.: US 6,687,613 B2
(45) Date of Patent: *Feb. 3, 2004

(54) DISPLAY METHOD AND APPARATUS OF NAVIGATION SYSTEM

(75) Inventor: Tatsuo Yokota, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 87 days.

This patent is subject to a terminal disclaimer.

(21) Appl. No.: 09/871,396

(22) Filed: May 31, 2001

(65) Prior Publication Data

US 2002/0183924 A1 Dec. 5, 2002

(51) Int. Cl.⁷ .......................................... G06F 165/00
(52) U.S. Cl. ....................................... 701/209
(58) Field of Search ................................. 701/200–201, 701/206–209, 211–213, 225; 340/988, 990, 992, 995; 342/357.12, 357.13, 457; 345/783, 802, 810–811, 817–820, 823, 825–826, 828–829

(56) References Cited

U.S. PATENT DOCUMENTS

| | | | |
|---|---|---|---|
| 5,568,390 A | | 10/1996 | Hirota et al. |
| 5,852,791 A | | 12/1998 | Sato et al. |
| 6,107,944 A | * | 8/2000 | Behr et al. .................. 340/988 |
| 6,202,023 B1 | * | 3/2001 | Hancock et al. ............ 701/201 |
| 6,349,257 B1 | * | 2/2002 | Liu et al. ..................... 340/5.6 |
| 6,401,034 B1 | * | 6/2002 | Kaplan et al. .............. 340/988 |
| 6,484,094 B1 | * | 11/2002 | Wako ........................... 701/211 |

* cited by examiner

*Primary Examiner*—Thu Nguyen
(74) *Attorney, Agent, or Firm*—Muramatsu & Associates

(57) ABSTRACT

A display method and apparatus for navigation system for displaying information necessary for guiding a driver of a vehicle. The navigation system is designed to enable a user (such as driver or passenger) quickly find and select the destination in a new area based on the names or places used in his/her home area. The navigation system includes a search method for searching a point of interest based on a list of preferred names specially created or based on a list of registered points used in his/her home area.

8 Claims, 9 Drawing Sheets

| Category List | 28 |
|---|---|
| Recreation | Input Category |
| Bank | Hotel |
| Emergency | Gas Station |
| Restaurant | Shopping |
| Travel | Automotive |
| Park | Theater |

| Dest | Find Point of Interest by |

- Place Name
- Place Type
- Preferred List

Enter ↓ ↑ Cancel

Fig. 5B

| Dest | Select Preferred POI |

- BANK OF AMERICA ▲
- CLAIM JUMPER
- IN-N-OUT BURGER
- MARRIOTT HOTEL
- SIZZLER
- VONS ▼

Enter ↓ ↑ Cancel

Fig. 5C

| Dest | Select Destination |

IN-N-OUT BURGER

- 23456 CRENSHAW BLVD.
  TORRANCE, CA — 1.6mi
- 1324 MAIN ST.
  CARSON, CA — 2.5mi
- 9876 INGLEWOOD
  REDONDO BEACH, CA — 3.8mi ▼

Enter ↓ ↑ Cancel

Fig. 5D

| Dest | Confirm Destination |

IN-N-OUT BURGER
23456 CRENSHAW BLVD.
TORRANCE, CA
(310) 123-4567

| Map | OK to Proceed | Call |

Add to Today's Plan

Options

| Dest | Confirmation Destination |
|---|---|
| IN-N-OUT BURGER<br>23456 CRENSHAW BLVD.<br>TORRANCE, CA<br>(310) 123-4567 | |
| OK to Proceed | Map |
| Add to Today's Plan | Call |
| Find Similar Place | Options |

— 72

Enter ↓    ↑ Cancel

Fig. 7B

| Dest | Find Similar Place |
|---|---|
| Same Name Sorted by Distance | Same Type Sorted by Distance |
| Same Name Within A City | Same Type Within A City |

— 74

Enter ↓    ↑ Cancel

Fig. 7C

| Dest | Select Destination |
|---|---|
| IN-N-OUT BURGER | |
| 12121 BALBOA AVE.<br>SAN DIEGO, CA | 4.1mi |
| 5555 CONVOY ST.<br>POWAY, CA | 12mi |
| 9001 VIA RANCHO PKWY.<br>ESCONDIDO, CA | 27mi ▼ |

— 76

Enter ↓    ↑ Cancel

Fig. 7D

| Dest | Confirm Destination |
|---|---|
| IN-N-OUT BURGER<br>12121 BALBOA AVE.<br>SAN DIEGO, CA<br>(619) 555-4321 | |
| OK to Proceed | Map |
| Add to Today's Plan | Call |
| Find Similar Place | Options |

DISPLAY METHOD AND APPARATUS OF NAVIGATION SYSTEM

FIELD OF THE INVENTION

This invention relates to a display method and apparatus of information retrieval system for displaying information necessary for finding business and other establishment of interest, and more particularly, to a display method and apparatus of information retrieval system such as navigation system for displaying information which assists in searching points of interest related to an area which is remote not familiar to a user without requiring entering a new name of point of interest.

BACKGROUND OF THE INVENTION

A vehicle navigation system performs vehicle travel guidance for enabling a driver to easily drive the vehicle to a selected destination. Such a navigation system detects the position of the vehicle, reads out map data pertaining to an area at the vehicle current position from a data storage medium, for example, a CD-ROM (compact disk read-only memory) or a DVD (digital videodisc), and displays a map image on a monitor (display) screen while superposing a mark representing the current location of the vehicle on a predetermined portion of the map image.

The vehicle position is determined by a self-contained navigation sensors (e.g. a distance traveled sensor and a bearing sensor) mounted in the vehicle or by a global positioning system (GPS) including a satellite (satellite navigation). The satellite enables absolute position detection and higher position accuracy than the self-contained navigation sensors. However, the satellite navigation involves problem of position detection failure such as in a tunnel or a building where the satellite radio signals are obstructed. Therefore, recent navigation systems utilize both self-contained navigation and satellite navigation to achieve improved performances.

As the present position of the vehicle changes with the travel of the vehicle, the vehicle current position mark in the map image on the screen is changed accordingly. Alternatively, the map is scrolled while the vehicle current position mark is fixed at a predetermined position, for example, at the center of the image. In either of the methods, the navigation system enables the driver to recognize the map information of the area at the vehicle position at a glance.

When a destination is not set, such as navigation system functions as a locator map which indicates the current location of the vehicle in a map image. When the destination is set, the navigation system starts a route guidance function for setting a guided route from the starting point to the destination. Typically, the route guidance function performs an intersection guidance process in which a monitor screen displays an enlarged intersection diagram and the direction in which the vehicle is to travel while displaying the guide route on a map. When a destination is input, a CPU in the navigation system determines the most suitable guided route from the current vehicle position to the destination and successively stores nodes (expressed in longitude and latitude) constituting the guided route in a memory.

During actual traveling, the node series stored in the memory is searched for a portion of the guided route to be displayed in a map display area of the monitor screen, and the portion of the guided route is highlighted so as to be discriminable from other routes. When the vehicle is within a predetermined distance of an intersection it is approaching, an intersection guidance diagram (an enlarged or highlighted intersection diagram with an arrow indicating the direction in which the vehicle is to turn at the intersection) is displayed to inform a driver of the desired one of roads or directions selectable at the intersection.

Figure 1A:
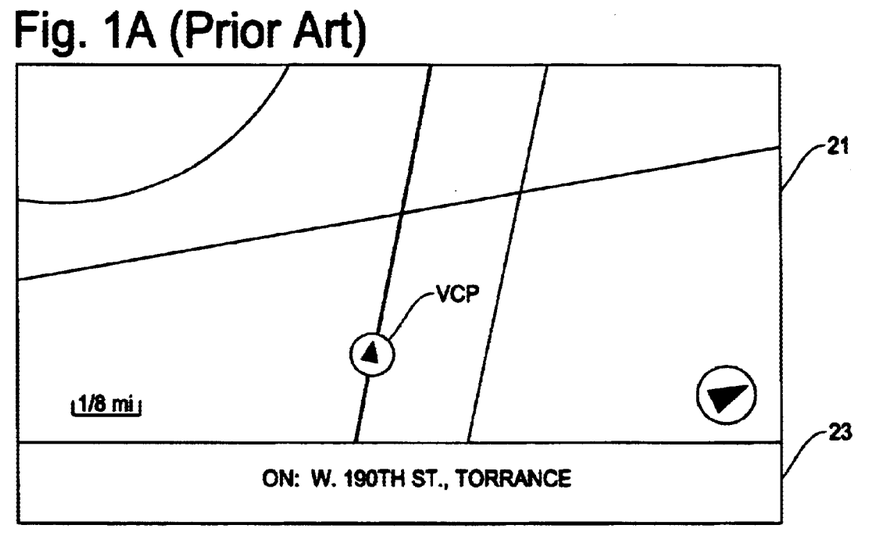
FIGS. 1A and 1B are schematic diagrams showing an example of locator map display and route guidance display, respectively, of a vehicle navigation system.

FIG. 1A shows an example of a locator map display containing a vehicle current position mark VCP on a map image 21. Typically, a navigation system shows the street on which the vehicle is running in the map image 21 and a name of the street such as "W 190TH ST" in an information box 23 on the monitor screen. Other information such as a north pointer NP, a map scale and a current time may also be illustrated on the display screen. In this manner, the locator map display shows the current position of the vehicle on the map image, however, it does not perform the route guidance function because the destination is not set in the navigation system.

Figure 1B:
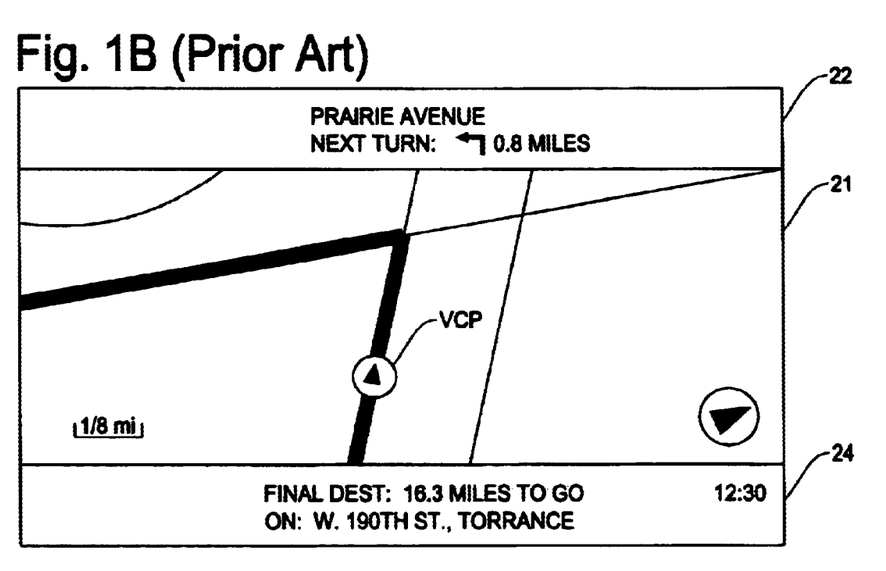

FIG. 1B shows an example of route guidance display which performs the route guidance function. The route guidance display is activated after specifying the destination of travel. In addition to the map image 21 similar to the locator map of FIG. 1A, this example further shows an arrow indicating the direction (left) in which the vehicle is to turn at the intersection in a guidance information box 22 at the top of the screen. The guidance information box 22 also shows a name of the street "PRAIRIE AVE" which intersects with the current street "W 190TH ST" and a distance to the intersection. Thus, the navigation system indicates that the vehicle should make a left turn at the intersection with "PRAIRIE AVE". Typically, the current street "W 190TH ST" and the left side of the street "PRAIRIE AVE" will be highlighted in the map image 21. Further, such route guidance is accompanied by spoken instructions. If the direction of travel in the next intersection is left, the navigation system gives spoken guidance such as "turn left at the next intersection". In this example, an information box 24 at the bottom of the display screen includes information regarding the remaining distance to the final destination and an estimated time to reach the final destination.

In order to be guided by the route guidance mode such as shown in FIG. 1B, a destination must be specified in the navigation system so that the system can find one or more routes to get to the destination. FIGS. 2A–2F show examples of display shown on the monitor screen during the operation of inputting the destination.

Figure 2A:
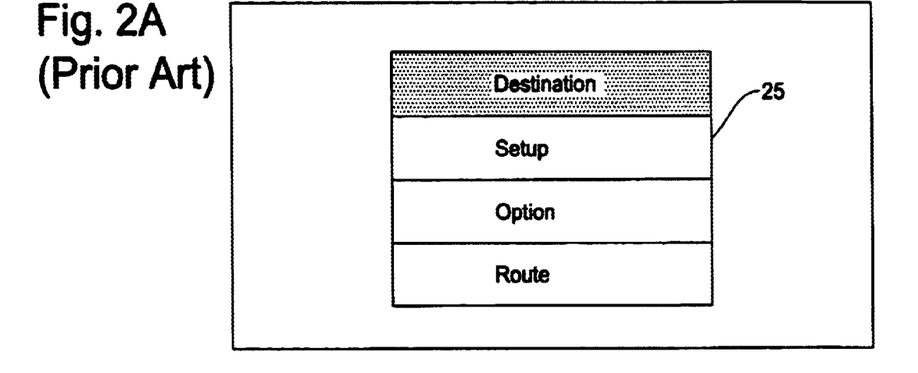
FIG. 2A is a main menu.
Figure 2B:
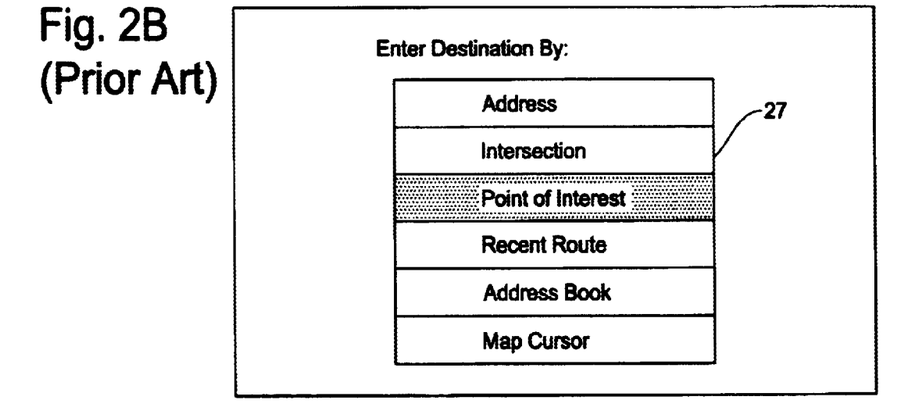
FIG. 2B is a destination set menu.

By operating a menu key, a main menu 25 such as shown in FIG. 2A is displayed on the navigation system and a menu item "Destination" is selected from the main menu. This allows the navigation system to display a "Enter Destination by" menu 27 as shown in FIG. 2B for specifying an input method for selecting the destination. The "Enter Destination by" menu 27 lists various methods for selecting the destination including "Address" for specifying the city and address of the destination, "Intersection" for specifying the names of two streets in the city which intersect with one another, and "Point of Interest" for selecting the programmed destination based on the name, category or telephone number.

Other methods in the "Enter Destination by" menu 27 include "Recent Route" for specifying the destination based on the recent destinations saved in the navigation system, "Address Book" for selecting the address of the destination out of the addresses stored in the system, and "Map Cursor" for specifying the destination by pointing a cursor to the destination on the map. For example, the information in the address book is formed of a list of names and addresses of the places that the driver frequently visits.

Figure 2C:
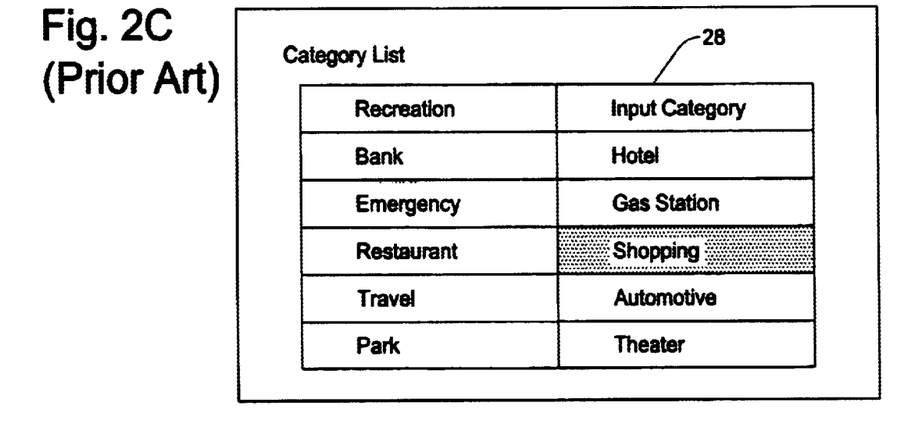
FIG. 2C shows a list of category when setting a point of interest.
Figure 2D:
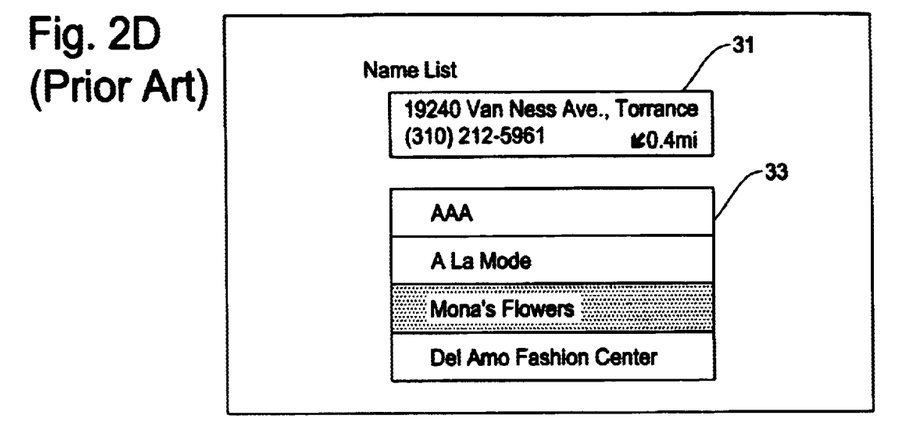
FIGS. 2D and 2E show name list in the category specified in FIG. 2C.
Figure 2E:
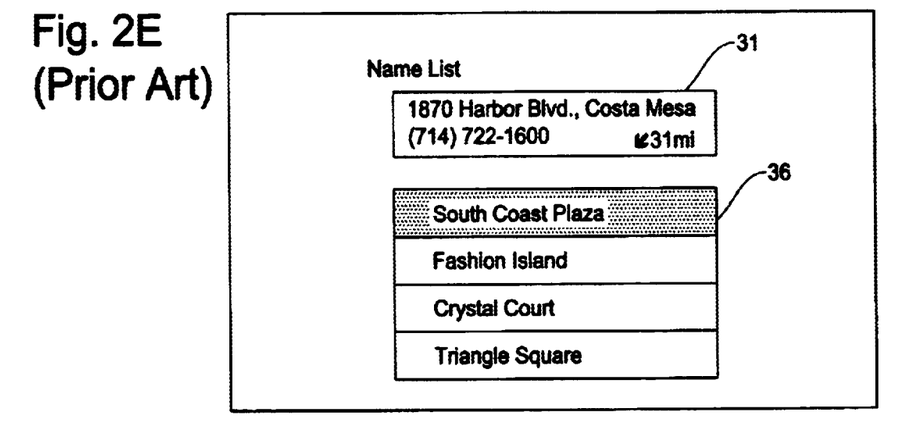

When selecting, for example, the "Point of Interest" in FIG. 2B, the navigation system displays a "Category List" menu 28 such as shown in FIG. 2C. The "Category List" menu 28 contains various different categories such as "Bank", "Restaurant", "Hotel", "Shopping" and others. Supposing the category "Shopping" is selected, the navigation system displays "Name List" such as shown in FIGS. 2D and 2E. The "Name List" shows names of shops and shopping malls sorted by, for example, distance from the vehicle. In an address information box 31 on the display, the address and phone number of the highlighted name in the list 33 will be displayed. The address information box 31 may also show the distance to the highlighted shop. Typically, the navigation system stores several tens or hundreds of names of shops within predetermined distances and displays several shops per page of display screen, and a user may scroll the display screen to see other names of shops in the name list 36 such as shown in FIG. 2E.

When the destination is not prestored in the navigation system, a user can input the destination by selecting, for example, the "Address" method or "Intersection" method in the "Enter Destination by" menu 27 of FIG. 2B. Then, the navigation system displays an "Enter Street Name" shown in FIG. 2F for inputting the city and address in an address input box 37 by means of a key board (keypad) 38 displayed on the monitor screen.

Figure 2F:
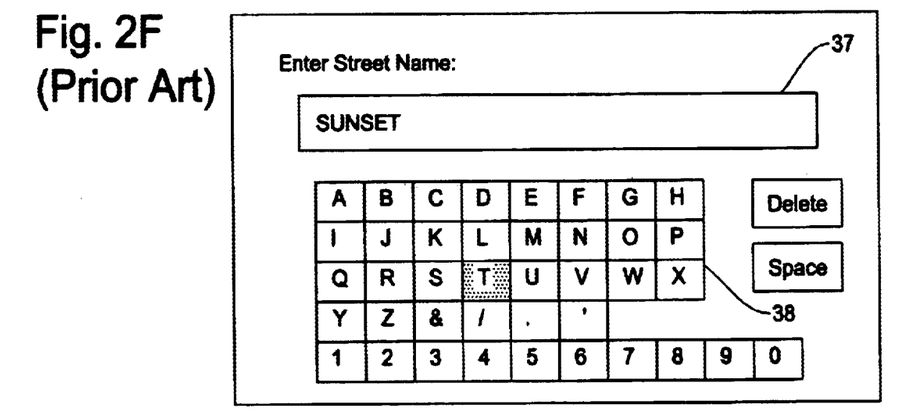
FIG. 2F shows a key board display for entering the address or intersection.

After inputting the destination, the navigation system determines a route to the destination based on, for example, by finding the shortest way to reach the destination. Thus, the navigation system moves to the route guidance display such as shown in FIG. 1B which performs the route guidance function. As noted above, the process of specifying the destination requires the driver to look at the information on the display screen such as shown in FIGS. 2A–2C, or scroll the display such as shown in FIGS. 2D and 2E, or even input the destination through the key board such as shown in FIG. 2F. Therefore, this process takes time and sometimes burdensome for the driver.

Such a process of specifying a destination is simplified by using an "Address Book" or "Recent Route" menu because such menu stores lists of pre-registered destination. Typically, such pre-registered destination lists include names and addresses of places that the driver frequently visits. Thus, the driver can simply select the name in the "Address Book" or "Recent Route" menu.

When a driver is in an area which is far away from his/her ordinary living and working area (hereafter "home area", because of a business trip or the like, the data in the "Address Book" or "Recent Route" cannot be used since this data is limited to the home area. In many occasions, a driver who is in a new area wants to go to a nearby store or bank, and etc., with the same name as he/she frequently visits in the home area.

In such a situation, the driver has to input new data even though the name of such a store, bank, or the like is in the address book or recent route menu such as shown in FIG. 2B. This is because the address book menu or recent route menu contains exact locations of the actual and possible destinations established by the user. Therefore, the addresses in the address book or recent route menu do not match the addresses of the new area even though the names are identical to one another.

As an example, suppose a driver who lives and works in San Francisco (home area) is now driving a car in Los Angeles area, he/she cannot use the information in the "Address Book" because the information in the address book is ordinarily limited to the places in the home area. Frequently, a driver wants to go to a branch office of his bank, a favorite restaurant chain, hotel or supermarket with membership benefits and the like when he/she is far away from the home area. Other example of occasion that the driver wants to visit places having the same type of business or name without regard to locations arises when he/she wants to see or collect unique goods such as antiques.

SUMMARY OF THE INVENTION

It is, therefore, an object of the present invention to provide a vehicle navigation system which enables a driver to easily operate the navigation system for specifying a destination in an area remote from his/her home area without inputting a name of the point of interest.

It is another object of the present invention to provide a vehicle navigation system which enables a driver to quickly enter a destination in an area far away from his/her home area with use of a specially made list such as "Preferred List" listing representative names of business chains.

It is another object of the present invention to provide a vehicle navigation system which enables a driver to quickly enter a destination in an area far away from his/her home area with use of pre-registered data such as "Address Book" listing names and addresses in the home area.

It is a further object of the present invention to provide a vehicle navigation system which is able to quickly specify the destination in a new area having the same name as that in the home area.

The navigation system is designed to enable a user quickly find and select the destination in a new area based on the names or places used in his/her home area. The navigation system includes a search method for searching a point of interest based on other input methods, such as a list of preferred names specially created for this purpose or based on a list of registered points already created and used in his/her home area.

In one aspect of the present invention, the display method of a vehicle navigation system enables a user to specify the destination through a "preferred list" menu in which a list of preferred names of the destination is created separately from other lists of names.

The method includes steps of forming a set of data listing names of business chains (hereafter "preferred list"), displaying a destination selection menu including a search method based on data stored in a storage medium (point of interest data) on a screen of the navigation system wherein the selection menu includes the preferred list, selecting the preferred list in the destination selection menu, displaying the list of names in the preferred list on the screen of the navigation system, selecting one of the names in the preferred list shown on the screen, examining the point of interest data in the storage medium and displaying a set of places within a predetermined distance from a current vehicle position having the same name selected from the preferred list, and specifying one of the places displayed on the screen as a destination.

In another aspect of the present invention, the display method of the present invention enables a user to specify the destination through a "find similar place" menu in the process of destination selection. This method does not require to create a specific name list such as the "preferred list" but can use a pre-existing name list such as an "address book" or a "recent route".

The method includes the steps of displaying a destination selection menu on a screen of the navigation system to show a search method based on registered points ("address book") or destination history ("recent route") in the navigation system created by a user, selecting one of the menu of either the address book or recent route and specifying a provisional (first) destination from a list of names in the selected menu, displaying the provisional destination on a confirmation screen of the navigation system wherein the confirmation screen includes a menu for searching places similar to the provisional destination ("find similar place" menu), selecting the "find similar place" menu, examining point of interest data in a storage medium for searching places similar to the provisional destination and displaying a set of places similar to the provisional destination, and specifying one of the places displayed on the screen as a final destination.

A further aspect of the present invention is a display apparatus of a vehicle navigation system. The display apparatus is configured by various means for achieving the display methods described above which utilizes the "preferred list" menu for finding the destination in an area remote from the home area of the user. A further aspect of the present invention is another display apparatus of a vehicle navigation system. The display apparatus is configured by various means for achieving the display methods described above which utilizes the "find similar place" menu for finding the destination in an area remote from the home area of the user.

According to the present invention, the vehicle navigation system enables the driver to operate the navigation system within a short period of time for specifying the destination with use of the name list having names of business chains or the pre-existing data concerning the home area. Thus, the driver can easily select a branch office of his bank, a favorite restaurant chain, membership hotel or the like, when he/she is far away from the home area. The navigation system is able to specify the destination of travel by a small number of key movements without affecting the driving.

BRIEF DESCRIPTION OF THE DRAWINGS

FIGS. 2A–2F are schematic diagrams showing display examples of a vehicle navigation system.

DETAILED DESCRIPTION OF THE PREFERRED EMBODIMENTS

The navigation system of the present invention is designed to enable a user (such as a driver or passenger) quickly find and select the destination in an new area based on the favorite names or places used in his/her home area. An example of displays in the first embodiment of the navigation system is shown in FIGS. 5A–5D in which the destination is specified through a "Preferred List" provided in the point of interest menu. In accordance with the present invention, a user such as a driver who lives and works in a home area, such as San Francisco, can quickly enter the favorite name of the chain store or branch office in a new area, such as Los Angeles, during his/her trip.

Figure 3:
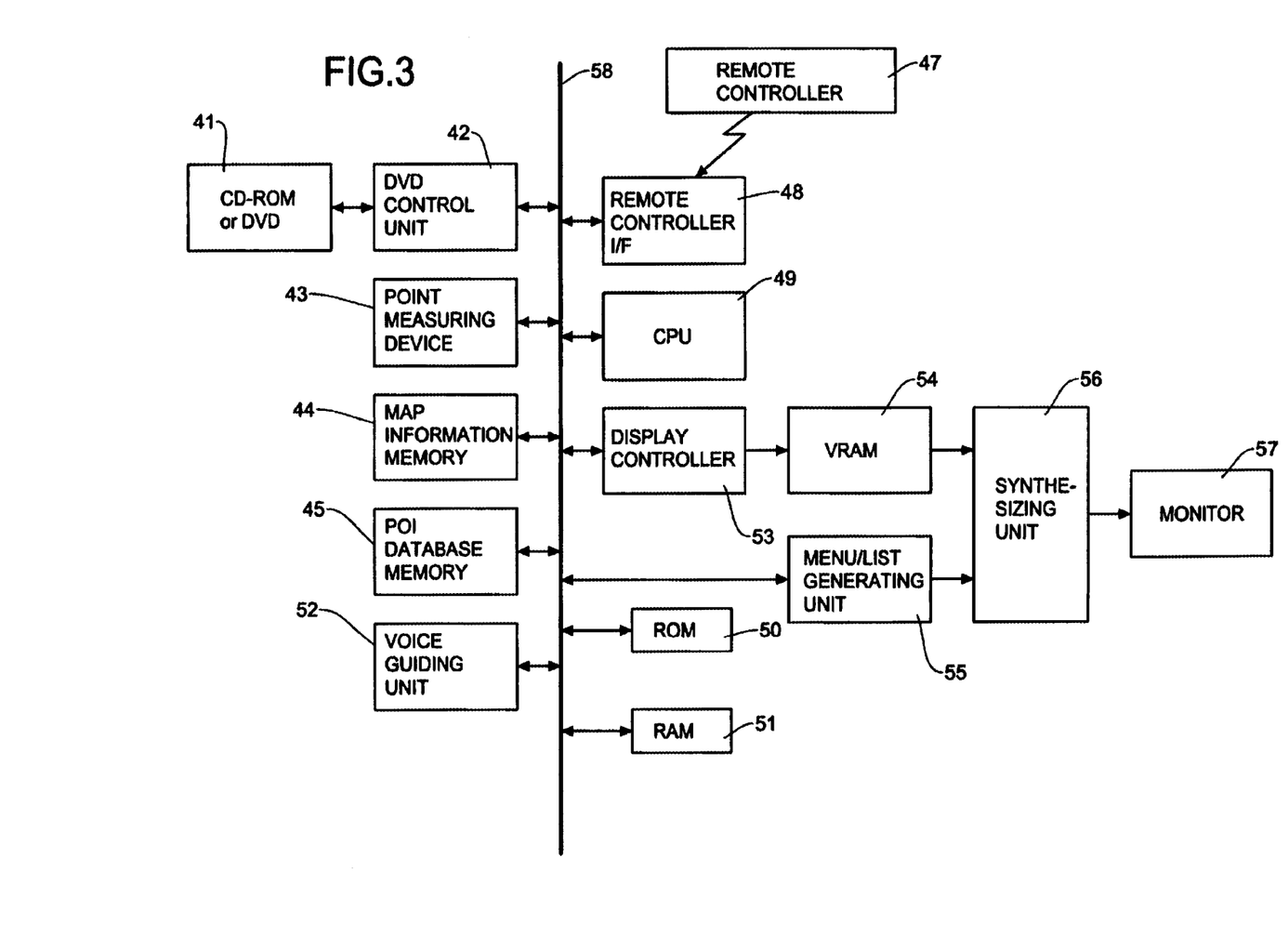
FIG. 3 is a block diagram showing an example of structure in the vehicle navigation system according to the present invention.
Figure 4:
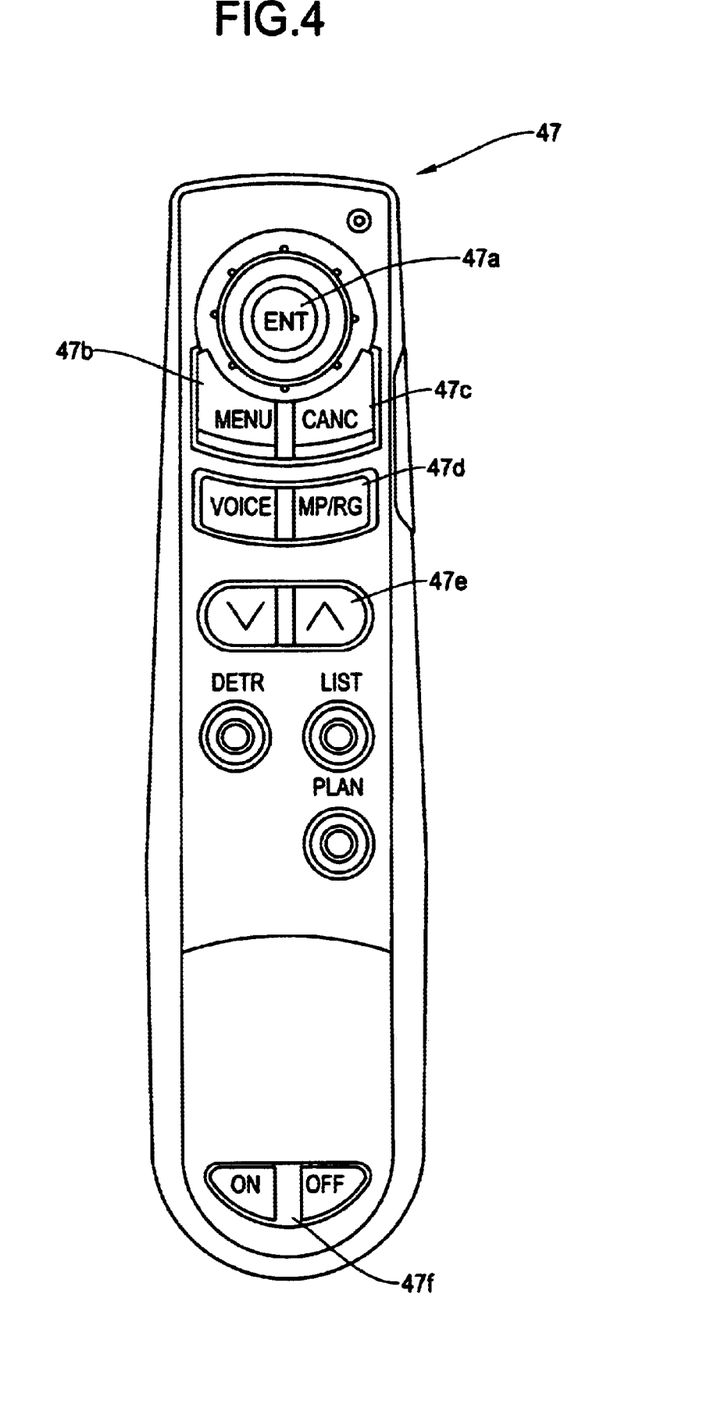
FIG. 4 is a diagram showing an example of a remote controller accompanied by the vehicle navigation system of the present invention.

Before going into details of the display examples of FIGS. 3–8, a brief description is given regarding the basic structure of the navigation system with reference to FIG. 3 and an example of remote controller for the navigation system with reference to FIG. 4. In the block diagram of FIG. 3, the navigation system includes a map storage medium 41 such as a CD-ROM or DVD (hereafter "DVD") for storing map information, a DVD control unit 42 for controlling an operation for reading the map information from the DVD, a point measuring device 43 for measuring the present vehicle position which has a vehicle speed sensor for detecting a moving distance, a gyro for detecting a moving direction, a microprocessor for calculating a position, a GPS receiver, and etc., a map information memory 44 for storing the map information which is read out from the DVD 41, a database memory 45 for storing database information such as point of interest (POI) information which is read out from the DVD 41.

The navigation system further includes a remote controller 47 for executing a menu selection operation, an enlarge/reduce operation, a destination input operation, etc. and a remote controller interface 48. As shown in FIG. 4, the remote controller 47 includes a joystick/enter key 47a, a menu key 47b, a cancel key 47c, an MP/RG key 47d, a zoom/scroll key 47e, a monitor ON/OFF key 47f, and so on. The joystick/enter key 47a has a function as a joystick key for moving the cursor or vehicle current position mark, etc., relatively in one of eight directions in the map or moving a menu bar (highlight) when selecting a desired menu item, and a function as an enter key for setting and inputting the cursor point and selecting and inputting the menu. Therefore, the joystick/enter key 47a will be also labeled simply as a joystick or enter key hereinafter.

The menu key 47b is operated when displaying a main menu, and the cancel key 47c cancels the present displayed screen or is operated when returning the screen to an initial screen of the menu. The MP/RG key 47d is operated when switching guiding modes (map guide mode and arrow mode), and when enlarging/reducing the map and vertically shifting the highlight point in various lists. The zoom/scroll key 47e is operated when changing map magnification ratio upward or downward or scrolling listings on the display screen.

Referring back to FIG. 3, the navigation system further includes a processor (CPU) 49 for controlling an overall operation of the navigation system, a ROM 50 for storing various control programs such as a route search program and a map matching program necessary for navigation control, a RAM 51 for storing a processing result such as a guide route, a voice guiding unit 52 for guiding a traveling direction at a crossroad with spoken instructions, a display controller 53 for generating map images (a map guide image and an arrow guide image) on the basis of the map information, a VRAM 54 for storing the images generated by the display controller, a menu/list generating unit 55 for generating menu image/various list images, a synthesizing unit 56 for synthesizing images from the VRAM 54 and the menu/list generating unit 55, a monitor (display) 57, and a bus 58 for interfacing the above units in the system.

Referring back to FIGS. 5A–5D, in the process of specifying the destination, the navigation system displays a "Find Point of Interest" menu screen 62 when the driver selects the "Destination" and "Point of Interest" in FIGS. 2A and 2B, respectively. In this example, the screen 62 shows a list of "Place Name", "Place Type" and "Preferred List" menus. The "Preferred List" menu in the screen 62 is a unique feature of the present invention.

As is known in the art, when selecting the "Place Name" or "Place Type", the navigation system displays a list of names or categories within a predetermined distance from the current vehicle position. Thus, in San Francisco area for example, names or types of such points of interest within a predetermined distance from the vehicle in San Francisco will be listed on the display screen. Suppose the driver likes hamburger of "In-N-Out Burger" in the home area (San Francisco) and wants to go to a chain restaurant of "In-N-Out Burger" in Los Angeles area. If there were no "Preferred List" menu of the present invention, the driver should have to find the name "In-N-Out Burger" by typing the name in the keypad screen and/or scrolling the list of names with use of the zoom/scroll key 47e and joystick key 47a. Moreover, if the Los Angeles area where the vehicle is now located has a large number of points of interest, such as several hundreds, it takes a long time to scroll the name list and find the name "In-N-Out Burger".

In the present invention, however, the driver selects the "Preferred List" in the screen 62. The navigation system displays a list of preferred points of interest in "Select Preferred POI" menu screen 64 shown in FIG. 5B. Such a "Preferred List" is created when the driver is in the home area by listing the favorite names of points of interest. For example, the "Preferred List" is created through the "Set Up" or "Option" menu in the main menu of FIG. 2A through various methods. Each name in the "Preferred List" should be a representative name without including information unique to a specific area. For example, a name of "Bank of America" should be listed in the Preferred List rather than "Bank of America China-town Branch".

Figure 5A:
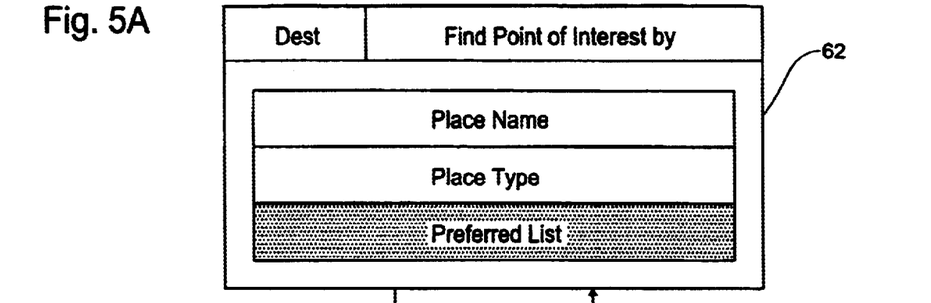
FIGS. 5A–5D are schematic diagrams showing display examples in the first embodiment of the navigation system for entering the destination through a "Preferred List" menu provided in the point of interest menu in accordance with the present invention.
Figure 5B:
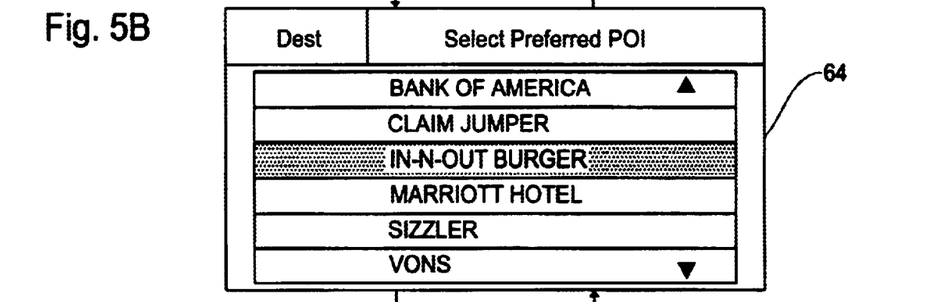
Figure 5C:
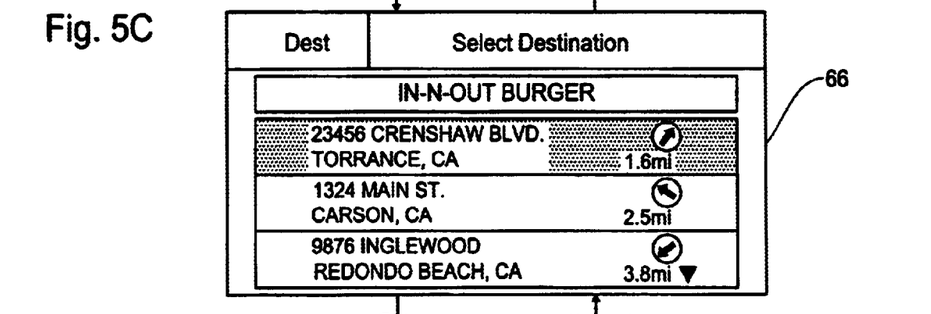

By selecting "In-N-Out Burger" in the menu screen 64, the navigation system displays a list of places carrying the name "In-N-Out Burger" in a "Select Destination" menu screen 66 as shown in FIG. 5C. The names of "In-N-Out Burger" are listed in the order of distance from the current vehicle location. In this example, each entry in the list shows an address, a distance from the vehicle, and a direction relative to the vehicle by an arrow.

Figure 5D:
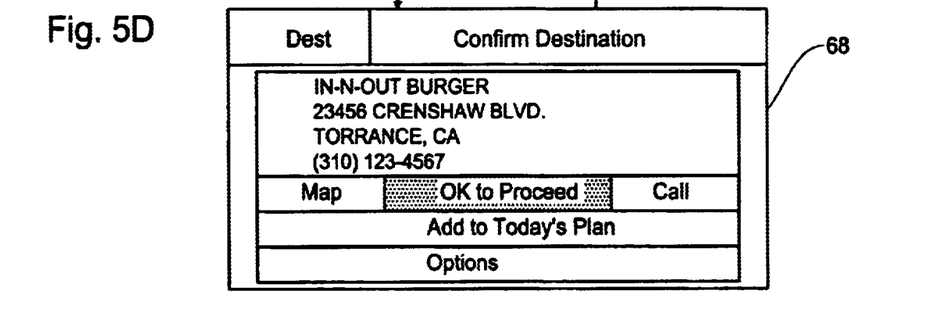

By selecting one of the entries in the list, the navigation system displays a "Confirm Destination" screen 68 which shows full information of the selected "In-N-Out Burger" in FIG. 5D. When the driver selects "OK to Proceed", the navigation system calculates appropriate routes to get to the selected "In-N-Out Burger" and changes the display to a route guidance screen such as shown in FIG. 1B.

Figure 6:
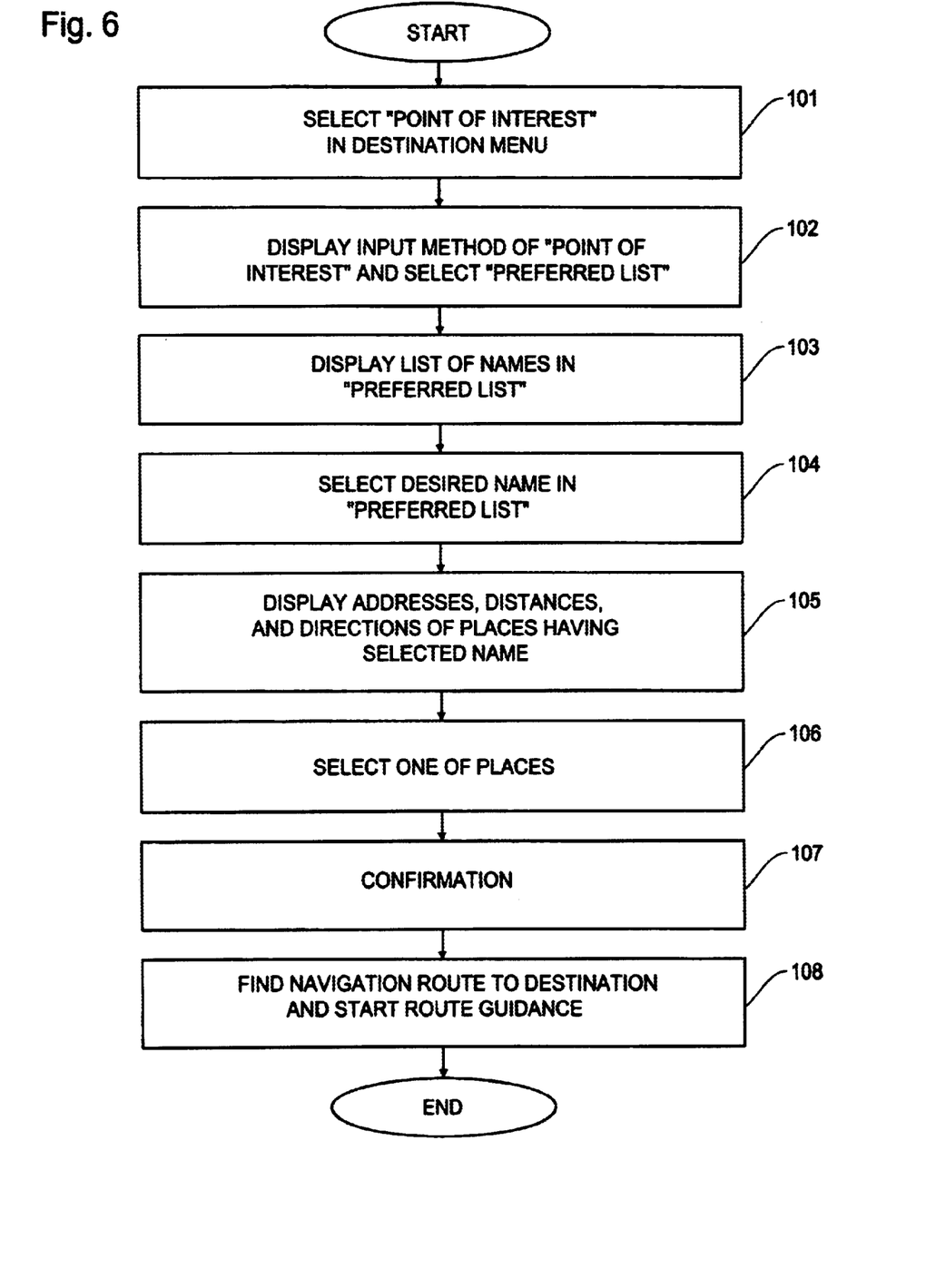
FIG. 6 is a flow chart showing an example of operational process in the first embodiment of navigation system shown in FIGS. 5A–5D.

The operational flow of the first embodiment is shown in FIG. 6. In this example, the operation starts after selecting "Destination" in the main menu such as shown in FIG. 2A. Thus, in the destination selection menu such as shown in FIG. 2B, the driver selects "Point of Interest" at step 101. Then, the navigation system displays the "Find Point of Interest by" screen 62 shown in FIG. 5A which lists input methods of point of interest. The list includes the "Preferred List" menu in accordance with the present invention. In step 102, the driver selects the "Preferred List" so that, at step 103, the navigation system displays the "Select Preferred POI" screen 64 of FIG. 5B showing a list of names in the "Preferred List".

In the display screen 64, the driver selects his/her favorite chain restaurant name such as "In-N-Out Burger" in step 104. Upon selecting the name, the navigation system displays information on all of the places having the name "In-N-Out Burger", i.e, business chains, within the predetermined distance from the current vehicle position in step 105. Examples of information in the list include address, distance and direction as shown in the screen 66 of FIG. 5C. Typically, the business chains are listed in the order of distance from the current vehicle position.

At step 106, the driver selects one of the business chains, i.e., the nearest "In-N-Out Burger", which results in the "Confirm Destination" screen 68 of FIG. 5D at step 107. If the information in the screen 68 matches the destination that the driver wants to go, he/she selects "OK to Proceed". Then, at step 108, the navigation system calculates appropriate routes to guide the driver to the selected destination and changes the display to a route guidance screen such as shown in FIG. 1B, which ends the process of entering the destination.

FIGS. 7A–7D show display examples in the second embodiment of the navigation system in which the destination is specified through a "Find Similar Place" menu provided in the process of destination selection. In the first embodiment noted above, it is necessary to create the "Preferred List" which lists names of chain stores, restaurant chains, or other business names or types having branch offices such as banks. In the second embodiment, the navigation system can detect such a business chain in a new area with use of a pre-existing data list such as an "Address Book". In other words, it is unnecessary to create a specific data list in the second embodiment. The "Address Book" can be accessed through the destination selection menu such as shown in FIG. 2B. Other possible pre-existing data list is a "Recent Route (or Previous Destination) " (FIG. 2B) which lists destinations recently selected by the driver.

Suppose the driver lives and works in Los Angeles area (home area) and thus, the Address Book in the navigation system includes names of the places that the driver frequently visits in Los Angeles, such as "Bank of America", "In-N-Out Burger" and "Vons". If the driver is visiting San Diego area and wants to go to "In-N-Out Burger" nearby, he/she operates the navigation system to display a list of names in the Address Book. Since the Address Book is ordinarily lists the names and addresses of the places in the home area, thus, the navigation system shows the name and address of "In-N-Out Burger" in the Los Angles area.

Figure 7A:
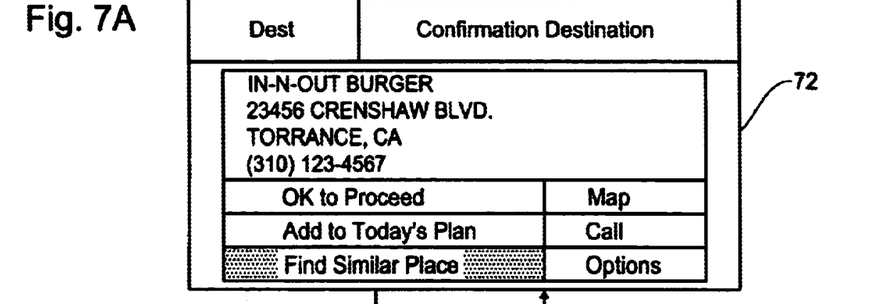
FIGS. 7A–7D are schematic diagrams showing display examples in the second embodiment of the navigation system for entering the destination through a "Find Similar Place" menu provided in the destination selection process in accordance with the present invention.

Although the driver is now in San Diego, in the present invention, he/she selects the name "In-N-Out Burger" in the Los Angles area. In response, the navigation system displays a "Confirm Destination" menu screen 72 such as shown in FIG. 7A. The screen 72 includes a "Find Similar Place" menu which is a unique feature of the present invention. The driver selects the "Find Similar Place" in the screen 72. Then, the navigation system displays a "Find Similar Place" menu screen 74 shown in FIG. 7B.

Figure 7B:
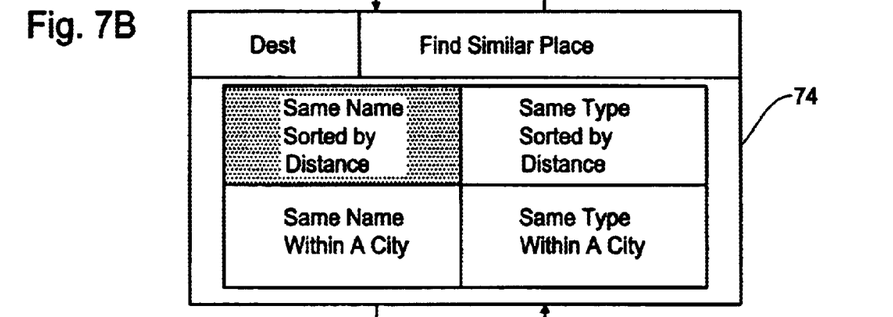

In this example, the "Find Similar Place" screen 74 shows methods of finding similar places including "Same Name Sorted by Distance", "Same Name within a City", "Same Type Sorted by Distance" and "Same Type Within a City". The "Same Name Sorted by Distance" is to show a list of places having the same name, in this case "In-N-Out Burger", within a predetermined distance from the current vehicle position. The "Same Name within a City" is to show a list of places having the same name "In-N-Out Burger" within a city where the vehicle is located or as specified by the user. The "Same Type Sorted by Distance" is to show a list of same types of place, in this case hamburger restaurants, within a predetermined distance from the current vehicle position. The "Same Type Within a City" is to show a list of same types of place, hamburger restaurants, within a city where the vehicle is located.

Figure 7C:
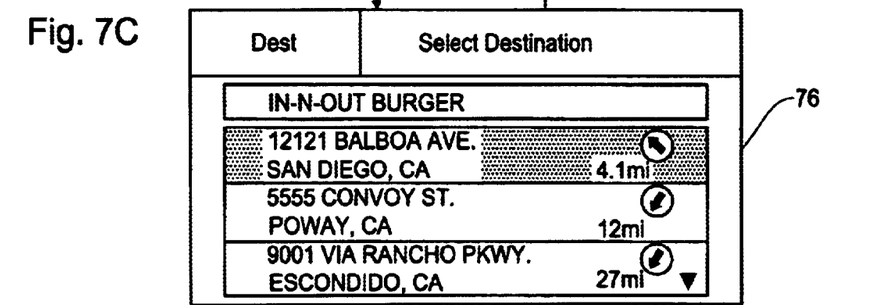

By selecting the "Same Name Sorted by Distance" in screen 74, the navigation system displays a "Select Destination" menu screen 76 shown in FIG. 7C which lists the places having the same name as "In-N-Out Burger" within a predetermined distance from the current vehicle position. The list of "In-N-Out Burger" is arranged in the order of distance from the vehicle and each entry includes information on the address, distance and direction.

Figure 7D:
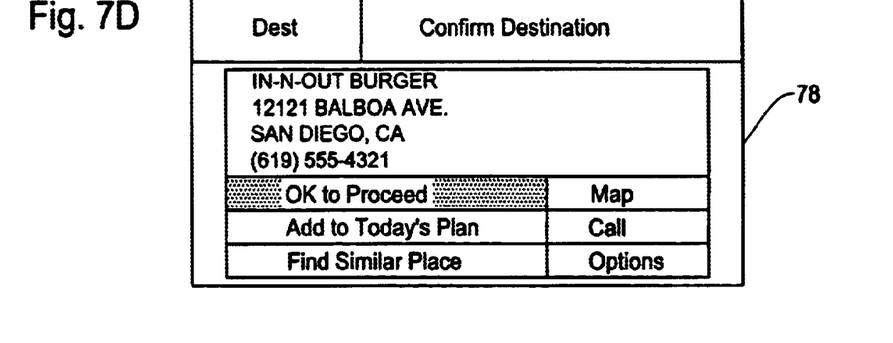

By selecting one of the entries in the list, the navigation system displays a "Confirm Destination" screen 78 which shows full information of the selected "In-N-Out Burger". When the driver selects "OK to Proceed", the navigation system calculates appropriate routes to get to the selected "In-N-Out Burger" and changes the display to a route guidance screen such as shown in FIG. 1B.

Figure 8:
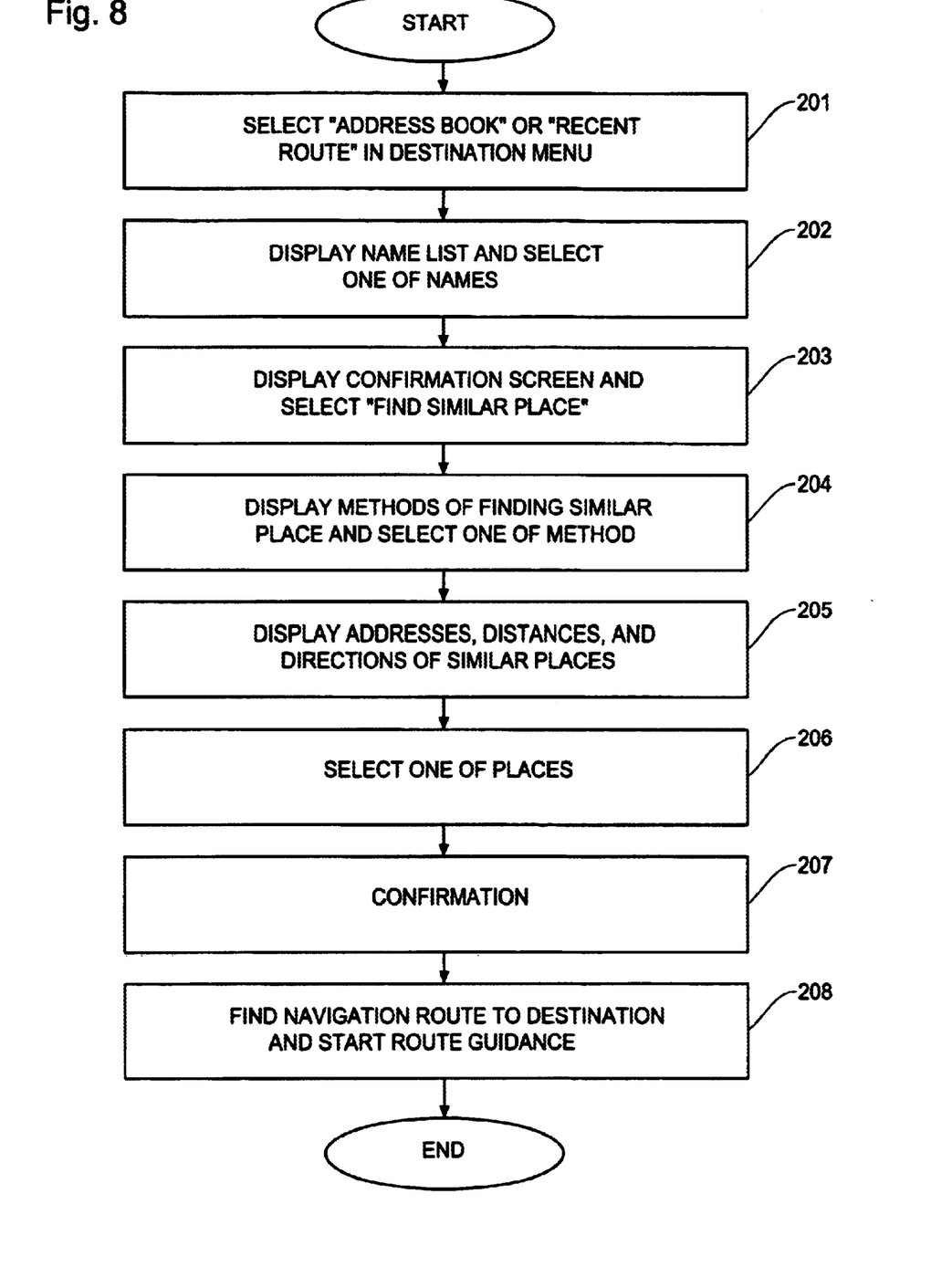
FIG. 8 is a flow chart showing an example of operational process in the second embodiment of navigation system shown in FIGS. 7A–7D.

The operational flow of the second embodiment is shown in FIG. 8. In this example, the operation starts after selecting the "Address Book" or "Recent Route" in the destination selection menu such as shown in FIG. 2B at step 201. The driver selects one of the names "In-N-Out Burger" in the "Address Book" or "Recent Route" at step 202. Then, at step 203, the navigation system displays the "Confirm Destination" screen 72 of FIG. 7A which shows the selected name "In-N-Out Burger" and its address in the home area. In the present invention, the "Confirm Destination" screen 72 includes the "Find Similar Place" menu. In step 203, the driver selects the "Find Similar Place" menu so that, at step 204, the navigation system displays methods of finding similar places as shown in the screen 74 of FIG. 7B. As noted above, examples of such methods include the "Same Name Sorted by Distance", "Same Name within a City", "Same Type Sorted by Distance" and "Same Type Within a City". The driver selects one of the methods in step 204.

Upon selecting the method, for example "Same Name Sorted by Distance", in step 205, the navigation system displays information on all of the places having the name "In-N-Out Burger", i.e, business chains, within the predetermined distance from the vehicle as shown in the screen 76 of FIG. 7C. Examples of information in the list include address, distance and direction and listed in the order of distance from the current vehicle position.

At step 206, the driver selects one of the business chains, i.e., the nearest "In-N-Out Burger", which results in the "Confirm Destination" screen 78 of FIG. 7D at step 207. If the information in the screen 78 matches the destination that the driver wants to go, he/she selects "OK to Proceed". Then, at step 208, the navigation system calculates appropriate routes to guide the driver to the selected destination "In-N-Out Burger" and changes the display to a route guidance screen such as shown in FIG. 1B, which ends the process of entering the destination.

As has been described above, according to the present invention, the vehicle navigation system enables the driver to operate the navigation system within a short period of time for specifying the destination with use of the preexisting data concerning the home area. Thus, the driver can easily select a branch office of his bank, a favorite restaurant chain, or other places, when he/she is far away from the home area. The navigation system is able to specify the destination of travel by a small number of key movements without affecting the driving.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A display method of a navigation system, comprising the following steps of:

forming a set of data listing names of business chains (hereafter "preferred list"), said set of data being registered by a user;

displaying a destination selection menu including a search method based on data stored in a storage medium (point of interest data) on a screen of the navigation system wherein the selection menu includes the preferred list;

selecting the preferred list in the destination selection menu;

displaying the list of names in the preferred list on the screen of the navigation system;

selecting one of the names in the preferred list shown on the screen;

examining the point of interest data having the same name selected from the preferred list in the storage medium and displaying a resultant set of places within a predetermined distance from a current vehicle position; and specifying one of the places displayed on the screen as a destination.

2. A display method of a navigation system as defined in claim 1, further comprising a step of confirming the selected destination by displaying detailed information on the selected destination.

3. A display method of a navigation system as defined in claim 1, further comprising a step of determining an appropriate route to the selected destination and displaying a route guidance screen for guiding the user to get to the selected destination.

4. A display method of a navigation system as defined in claim 1, wherein the step of displaying the set of places having the same name selected from the preferred list further including a step of arranging the set of places in the order of distance from the current vehicle position.

5. A display method of a navigation system as defined in claim 1, wherein the business chains include chain stores, chain restaurants, companies having branch offices, private or public organizations having affiliated organizations, and wherein each of the business chains has a name common among the chain.

6. A display apparatus of a navigation system, comprising:

means for forming a set of data listing names of business chains (hereafter "preferred list"), said set of data being registered by a user;

means for displaying a destination selection menu including a search method based on data stored in a storage medium (point of interest data) on a screen of the navigation system wherein the selection menu includes the preferred list as a selection item;

means for selecting the preferred list in the destination selection menu;

means for displaying the list of names in the preferred list on the screen of the navigation system;

means for selecting one of the names in the preferred list shown on the screen;

means for examining the point of interest data having the same name selected from the preferred list in the storage medium and displaying a resultant set of places within a predetermined distance from a current vehicle position; and means for selecting one of the places displayed on the screen as a destination.

7. A display apparatus of a navigation system as defined in claim 6, further comprising means for determining an appropriate route to the selected destination and displaying a route guidance screen for guiding the user to get to the selected destination.

8. A display apparatus of a navigation system as defined in claim 6, further including means for arranging the set of places in the order of distance from the current vehicle position.

* * * * *